Patented Apr. 2, 1935

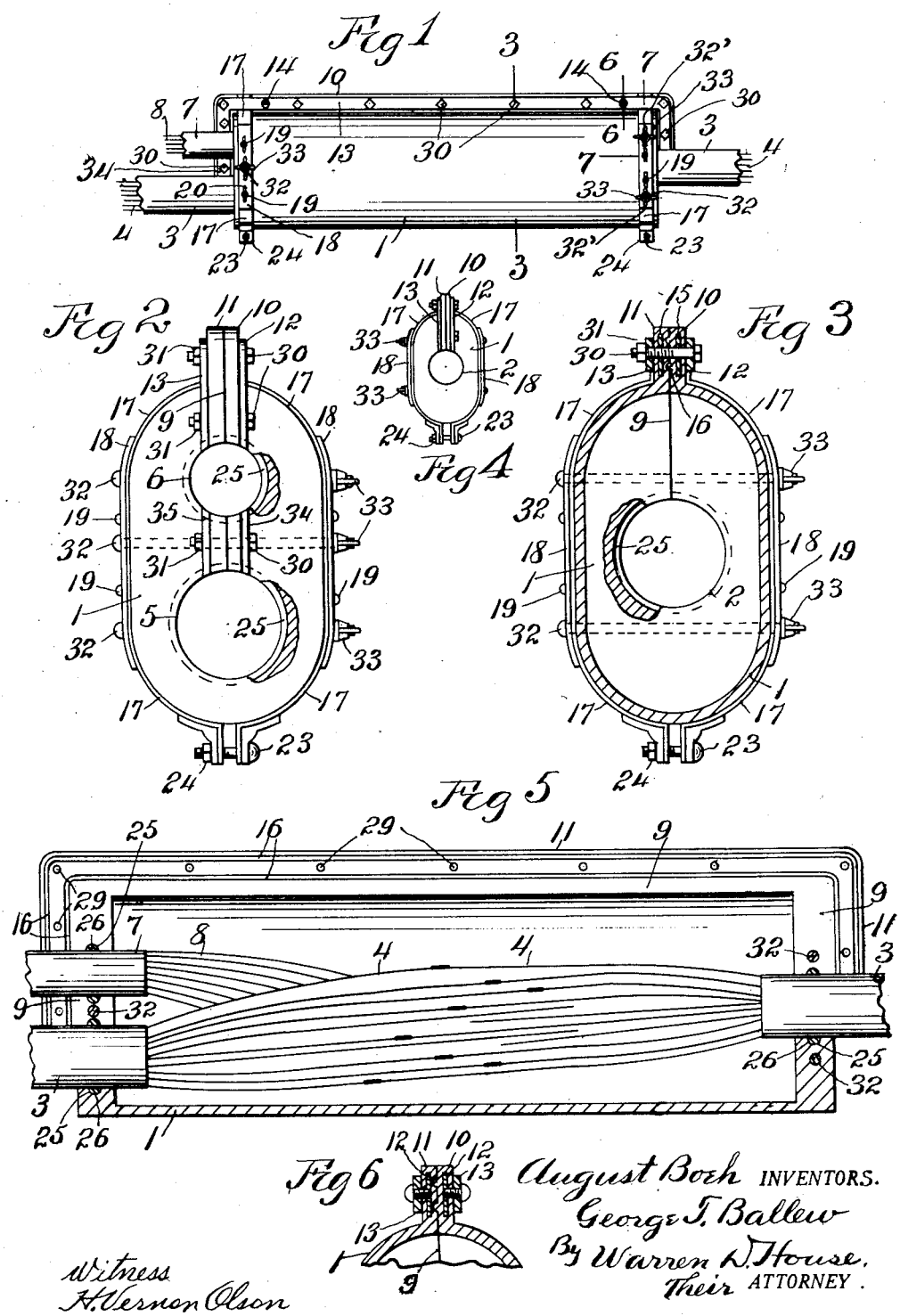

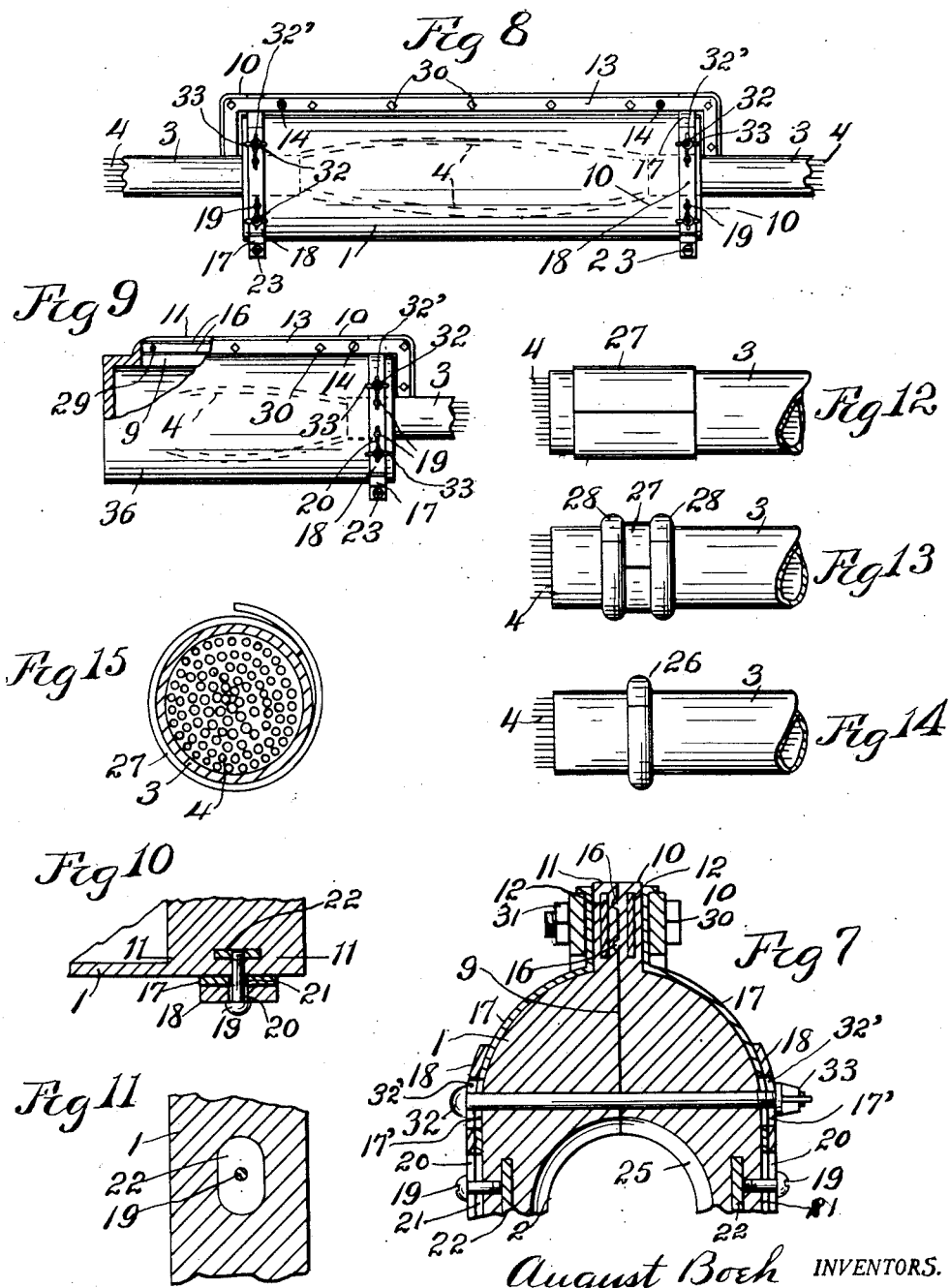

1,996,565

UNITED STATES PATENT OFFICE 1,996,565

TEMPORARY CABLE COVERING

August Boeh and George T. Ballew, Kansas City, Mo., assignors of one-third to Forest W. Spaun, Topeka, Kans.

Application December 2, 1929, Serial No. 411,057

7 Claims. (Cl. 173—268)

Our invention relates to improvements in temporary cable coverings.

One of the objects of our invention is to provide a novel water proof covering which can be quickly and easily applied to a cable where a splice is being made, so as to temporarily cover and protect the exposed wires, which are to be spliced, from moisture and the elements.

A further object of our invention is to provide a novel temporary covering of the kind described, which is simple, inexpensive, durable, not likely to get out of order, which, when mounted in operative position on a cable, will be air and water tight, which can be utilized at points where branches are being spliced to a main cable, and which can be readily mounted onto and removed from a cable.

Still another object of our invention is the provision of a novel packing ring to be applied to the cable sheath where it enters the casing, which ring is not required to be slipped over the end of the sheath, but is formed thereon.

The novel features of our invention are hereinafter fully described and claimed.

In the accompanying drawings, which illustrate our invention,

Fig. 1 is a side view of our improved temporary cable covering shown mounted on a cable to which a branch cable is being spliced.

Fig. 2 is an enlarged view, partly broken away, looking at the end of the casing from which the branch cable is to emerge, the sheaths being removed.

Fig. 3 is an enlarged section, partly broken away on the line 3—3 of Fig. 1, the sheath being removed.

Fig. 4 is a reduced view looking at the end of the casing having a single cable receiving opening, the sheath being removed.

Fig. 5 is an enlarged central longitudinal sectional view of what is shown in Fig. 1.

Fig. 6 is an enlarged section on the line 6—6 of Fig. 1.

Fig. 7 is an enlarged section on the line 7—7 of Fig. 1.

Fig. 8 is a side view of our improved cable covering provided with but a single opening in each end.

Fig. 9 is a side view of our improved cable covering one end, only, of which is provided with a cable receiving opening.

Fig. 10 is an enlarged section on the line 10—10 of Fig. 8.

Fig. 11 is a section on the line 11—11 of Fig. 10.

Fig. 12 is a side view of a part of a cable on the sheath of which is wound a strip of adhesive tape with its ends overlapped and fastened together, preparatory to forming from the strip a ring packing.

Fig. 13 is a view similar to Fig. 12, showing the tube formed from the adhesive strip with its ends rolled toward each other on the cable sheath.

Fig. 14 is a view similar to Fig. 13, showing packing ring in its completed form of a single roll.

Fig. 15 is an enlarged cross section of a cable having wound thereon the adhesive strip which is to be formed into a packing ring.

Similar reference characters designate similar parts in the different views.

Referring to Figs. 1 to 7, 1 designates the tubular body of the casing, which body is of water proof flexible material, preferably soft rubber fabric composite, or soft rubber alone.

One end, the right one, as shown in Figs. 1 and 5, is closed, excepting for a central opening 2, which is adapted to receive a cable sheath 3 and the wires 4 projecting therefrom, as shown in Fig. 5, which wires are in the process of being spliced to similar wires 4, which project into the body 1 from the adjacent end of another sheath 3, which is inserted into an opening 5 in the other end of the casing body 1.

The last named end of the body 1 is also provided with a smaller opening 6 adapted to receive the sheath 7 of a branch cable, the wires 8 of which are projected into the body 1 and are to be spliced to some of the wires from one of the other cables.

The body 1 is provided with a longitudinal slit 9 which extends from the opening 2 to and through one side only of the body 1 and the opening 6 to the opening 5, Figs. 2, 3 and 5.

The body 1 is provided at opposite sides respectively of the slit 9 with longitudinal laterally extending flanges 10 and 11, which in length are coextensive with the slit 9, being extended from the opening 2 to the opening 5, excepting where they are intercepted by the opening 6.

Re-enforcing plates or bars 12 are respectively longitudinally embedded in the flanges 10 and 11.

Re-enforcing bars or plates 13 may also be mounted, as shown upon the outer sides respectively of the flanges 10 and 11, to which they are secured by screws 14, which enter threaded holes in plates 12 respectively embedded in the flanges 10 and 11, as shown in Fig. 6.

The inner side of flange 11 is provided with longitudinal grooves adapted to respectively receive longitudinal flanges 16, Fig. 7, on the inner side of the flange 10.

At opposite sides of the body 1 adjacent to each end are respectively mounted flexible re-enforcing metal strips 17, at the outer sides of which are respectively mounted heavier metal plates 18, which are held clamped to the strips 17, by screws 19, which extend through slots 20 in the plates 18 and through slots 21 in the strips 17, and which are fitted in threaded holes in plates 22 embedded in the adjacent end of the body 1, Figs. 1, 2, 3 and 7.

One set of ends of each pair of strips 17 are turned laterally outwardly from the body 1 and are spaced apart.

Bolts 23 provided with nuts 24 connect the spaced apart laterally turned parts of the strips 17, at opposite ends respectively of the body 1. By tightening the nuts 24 on the bolts 23, the plates or strips 17 may be drawn toward each other.

The body 1 and the metal strips or plates 17 being flexible, the body may be flexed so as to move the flanges 10 and 11 apart sufficiently to permit the casing being slipped onto the end portions of the sheaths 3, so as to cover the exposed wires 4 that are in process of being spliced, when it becomes necessary to leave the work of splicing before it has been finished.

In adjusting the casing, the sheaths 3 are mounted in the openings 2 and 5 respectively, and the branch sheath is mounted in the opening 6.

The ends of the body 1 next to sheath receiving openings therein are provided with annular grooves 25 respectively encircling the openings 2, 5 and 6, Figs. 2, 3 and 7, and adapted to respectively receive three packing rings 26, Fig. 5, which are respectively tightly fitted on the sheaths 3 and 7.

As complete packing rings can not be slipped over the ends of the sheaths, we have provided a novel packing ring that can be formed on the sheath so as to be an integral ring.

Each ring 26 is made by winding tightly on the sheath 3 or 7, as the case may be, a strip 27 of adhesive tape, having its ends overlapped and fastened together, as shown in Figs. 12 and 15.

Opposite ends of the tube thus formed are rolled on the sheath toward each other, thus forming two rolls 28, Fig. 13. One of these rolls 28 is then rolled over the other one, so as to form one roll, or the packing ring 26, as shown in Fig. 14.

When the sheath is mounted, as the sheath 3 in the opening 2, the adjacent packing ring 26 is mounted in the annular groove 25. The three packing rings 26 are thus mounted in their respective grooves 25 when the three sheaths 3 and 7 are fitted in the openings 2, 5 and 6, as shown in Fig. 5.

To releasably fasten together the flanges 10 and 11, so as to close the slit 9 and to clamp the body 1 and packing rings 26 tightly on the sheaths 3 and 7 around the openings 2, 5 and 6 respectively, the following described means is employed.

Through the flanges 10 and 11 are transverse holes 29, Fig. 5, through which are inserted bolts 30, which extend through the re-enforcing plates 13, the bolts 30 having nuts 31 which bear against one of the plates 13. By tightening the nuts 31 on the bolts 30, the flanges 10 and 11 are held clamped tightly together.

The end of the body 1 having the opening 2 is provided therethrough with two transverse holes through which respectively extend bolts 32, respectively above and below the opening 2, Figs. 3 and 7, which are provided with wing nuts 33, which, when tightened, clamp the body 1 and adjacent ring 26 tightly against the adjacent sheath 3 around the opening 2. The bolts 32 extend through slots 32' and 17' respectively provided in the plates 18 and strips 17, Fig. 7.

The other end of the body 1 is provided between the openings 5 and 6 with a transverse hole through which is extended a bolt 32 having a wing nut 33, the latter being tightened to clamp the body 1 and packing rings 26 around the sheaths 3 and 7.

The flanges 10 and 11 between the openings 5 and 6 have clamped respectively to their outer sides two plates 34 and 35 through which removably is extended a clamping bolt 30 having a nut 31. To remove the casing for further splicing work on the cables, the nuts 31, bolts 30, bolts 32 and wing nuts 33 are removed, after which the flanges 10 and 11 may be forced apart sufficiently to enable the casing to be withdrawn from the sheaths 3 and 7 and the wires 4.

The form shown in Fig. 8 is the same as has been described with reference to Figs. 1 to 7, excepting that the left end, as viewed in Fig. 8, there is but a single central opening, which left end is constructed the same as the right end of the casing shown in Fig. 1, this form being employed to cover a splice having no branch connections.

To cover one exposed end of a cable only, the form shown in Fig. 9 is provided, in which form the slit 9, flanges 10 and 11, and plates 12 and 13 extend from the opening in the right end of the body to a point short of the opposite end which is permanently closed and has no opening. In the form shown in Fig. 9, the slit 9 is closed in the same manner as has been described with reference to the other forms of casings, by bolts 30 extending through the flanges 10 and 11 and plates 12 and 13.

At the right end where the cable enters, in Fig. 9, flexible plates 17 are clamped to opposite sides of the body 36 by removable bolts 32 having wing nuts 33, one set of ends of the plates 17 being connected by a bolt 23 having a nut 24, as has been described with reference to the other forms.

By having the slit 9, in the forms shown in Figs. 1, 8 and 9, in one side only of the casing and extending to the end openings, and the other side of the casing being flexible and adapted to serve as a hinge, the casing may be opened like a satchel for the insertion into and removal of the sheaths from the casing, without having to disassemble the latter.

We do not limit our invention to the structures shown and described, as many modifications, other than those shown, may be made, within the scope of the appended claims, without departing from the spirit of our invention.

What we claim is:—

1. A temporary cable covering comprising a casing having in one end an opening adapted to receive the end of a cable sheath and wires projecting therefrom, and having a slit extending from said opening longitudinally in one side only of said casing, the other side of said casing being closed and flexible and adapted to serve as a hinge permitting said casing to be opened as a satchel for the insertion therein or removal therefrom of said sheath, and releasable means for closing said slit and for tightly clamping said casing to said sheath around said opening and which permits removal of said sheath without breaking, cutting or otherwise damaging said casing.

2. A temporary cable covering comprising a casing having two openings respectively in its ends adapted to respectively receive the ends of the sheaths of two cables and the wires thereof to be joined together, said casing having a slit extending longitudinally in one side only of said casing to said two openings, the other side of said casing being closed and flexible and adapted to serve as a hinge permitting said casing to be opened as a satchel for the insertion therein or removal therefrom of said sheaths, and releasable means for closing said slit and for tightly clamping said casing to said sheaths around said two openings and which permits removal of said sheath without breaking, cutting or otherwise damaging said casing.

3. A temporary cable covering comprising a casing having a body provided at one end with an opening adapted to receive one end of a cable sheath and the wires projecting therefrom, and having at its other end two openings adapted to respectively receive two ends of two cables and the wires projecting therefrom adapted to be spliced with the first named wires, said body having in one side only a longitudinal slit extending from the first named opening to the other two openings, the other side of said casing being closed and flexible and adapted to serve as a hinge permitting said casing to be opened as a satchel for the insertion therein or removal therefrom of said sheath and cables, and releasable means for closing said slit and for tightly clamping said casing body to said sheaths around said openings and which permits removal of said sheath without breaking, cutting or otherwise damaging said casing.

4. A temporary protector for uncompleted cable splices including a bag of waterproof material, a separable frame integral with the bag and having openings for the admission of cable ends from which a splice is made, and means for securely clamping the frame together and about said cables adjacent their ends to provide with the bag a watertight enclosure for the cable splices.

5. A temporary protector for uncompleted cable splices including a bag of waterproof material, and a frame member having hinged sections connected with said bag, said sections having cooperating openings for the admission of cables from which the splice is made, inter-engaging means on each of the hinged sections cooperating to form a watertight enclosure for the cables, and means for clamping the last-mentioned means together and about said cables at their point of entrance through said sections.

6. A temporary protector for uncompleted cable splices including a bag of waterproof material, a separable frame integral with the bag and having openings for the admission of cable ends from which a splice is made, compressible gaskets carried by the separable frame and means for clamping the frame together to cause said gaskets to apply pressure about said cables adjacent their ends to provide with the bag a watertight enclosure for the cable splices.

7. A temporary protector for uncompleted cable splices including a cover of waterproof material, an adjustable frame integral with the cover and having openings for the admission of cable ends from which a splice is made, and means for securely clamping the frame about said cables adjacent their ends to provide with the cover a watertight enclosure for the cable splices.

AUGUST BOEH.
GEORGE T. BALLEW.